Nov. 12, 1935.     O. E. BUCKLEY ET AL     2,020,297
SUBMARINE CABLE TRANSMISSION
Filed Oct. 6, 1933     4 Sheets-Sheet 1
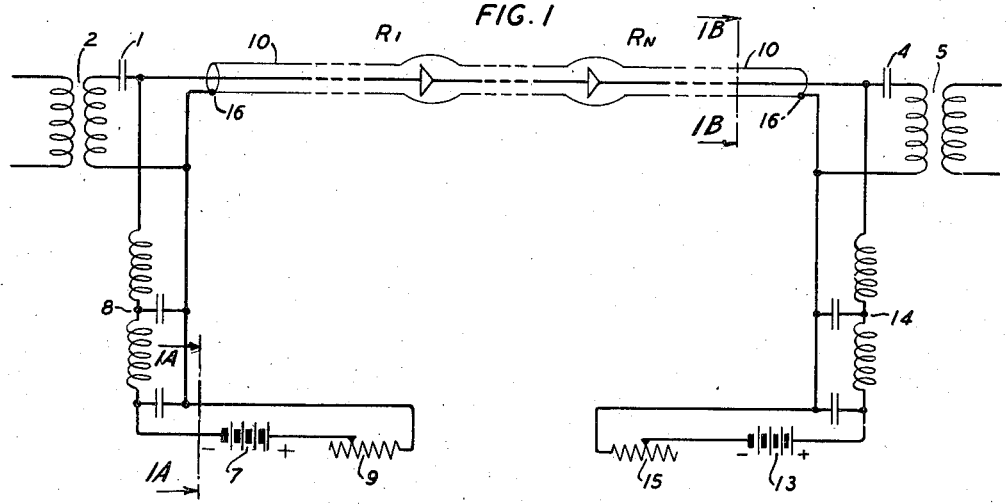
FIG. 1
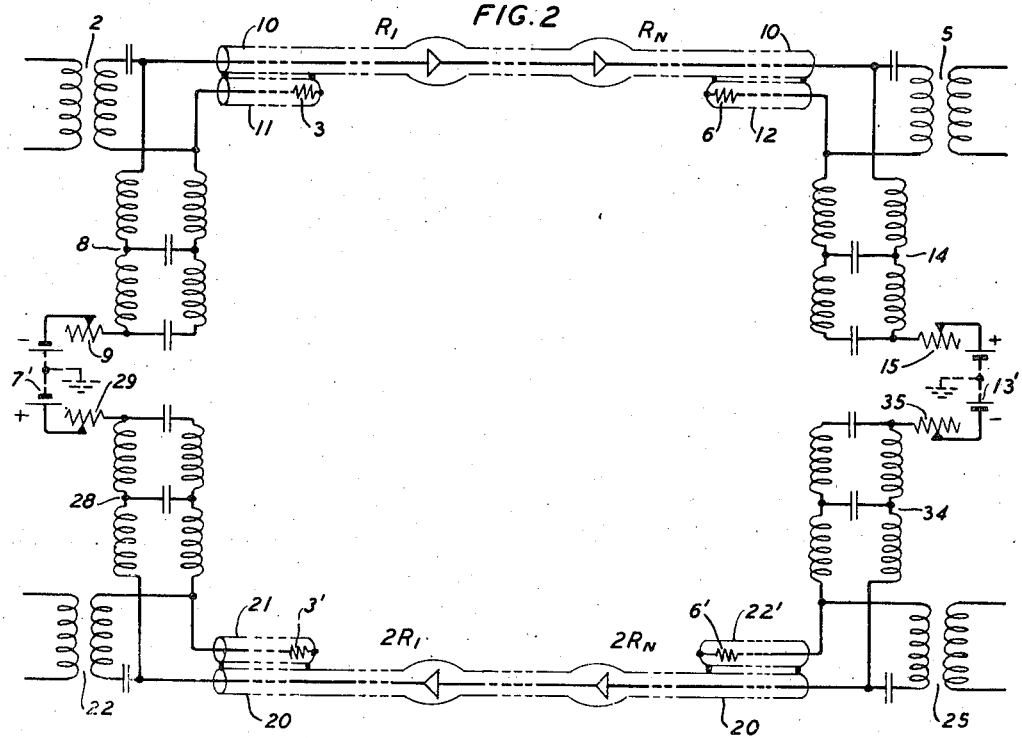
FIG. 2
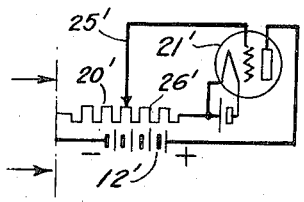
FIG. IA.
INVENTORS: O.E. BUCKLEY
O.B. JACOBS
BY
ATTORNEY Nov. 12, 1935.  O. E. BUCKLEY ET AL  2,020,297
SUBMARINE CABLE TRANSMISSION
Filed Oct. 6, 1933   4 Sheets-Sheet 2
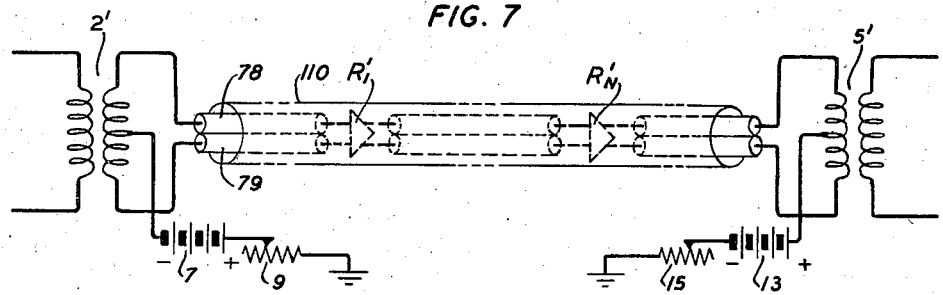
FIG. 7
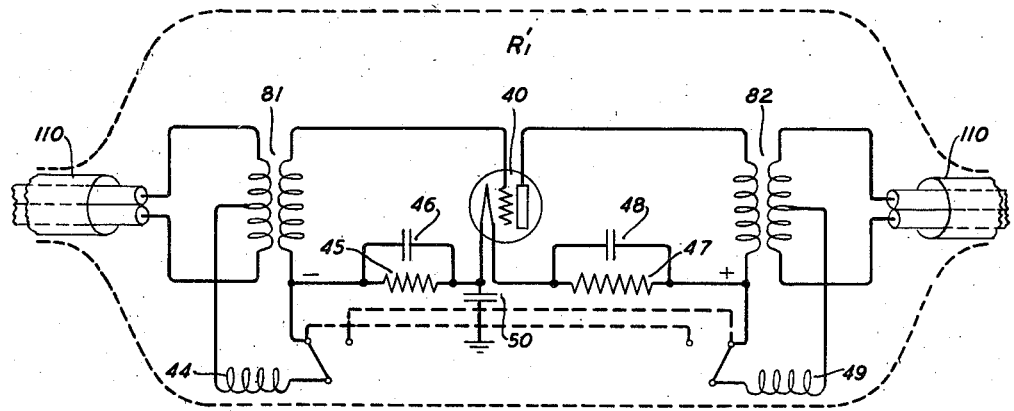
FIG. 8
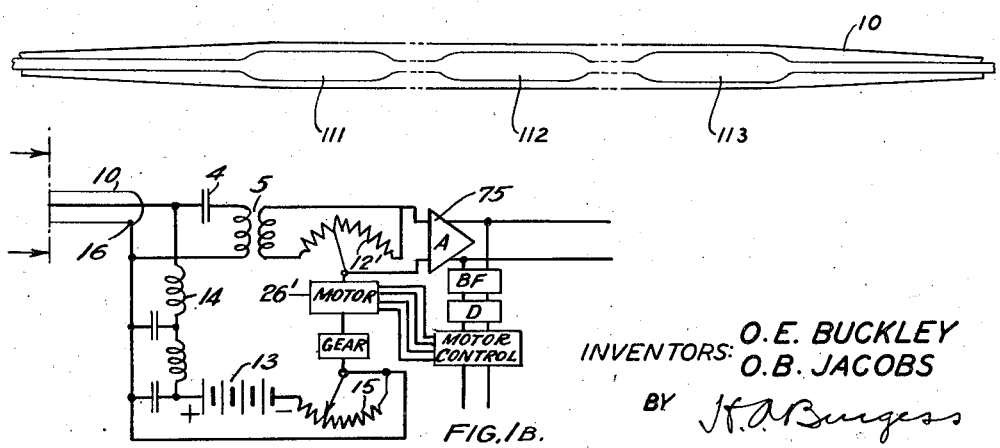
FIG. 11
FIG. 1B.
INVENTORS: O. E. BUCKLEY
O. B. JACOBS
BY
ATTORNEY Nov. 12, 1935.  O. E. BUCKLEY ET AL  2,020,297
SUBMARINE CABLE TRANSMISSION
Filed Oct. 6, 1933  4 Sheets-Sheet 3
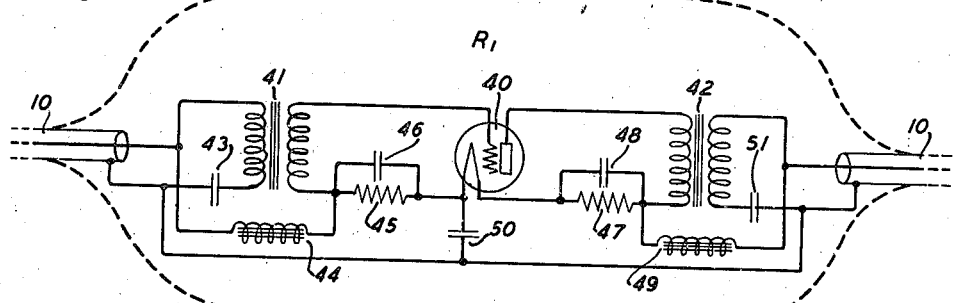
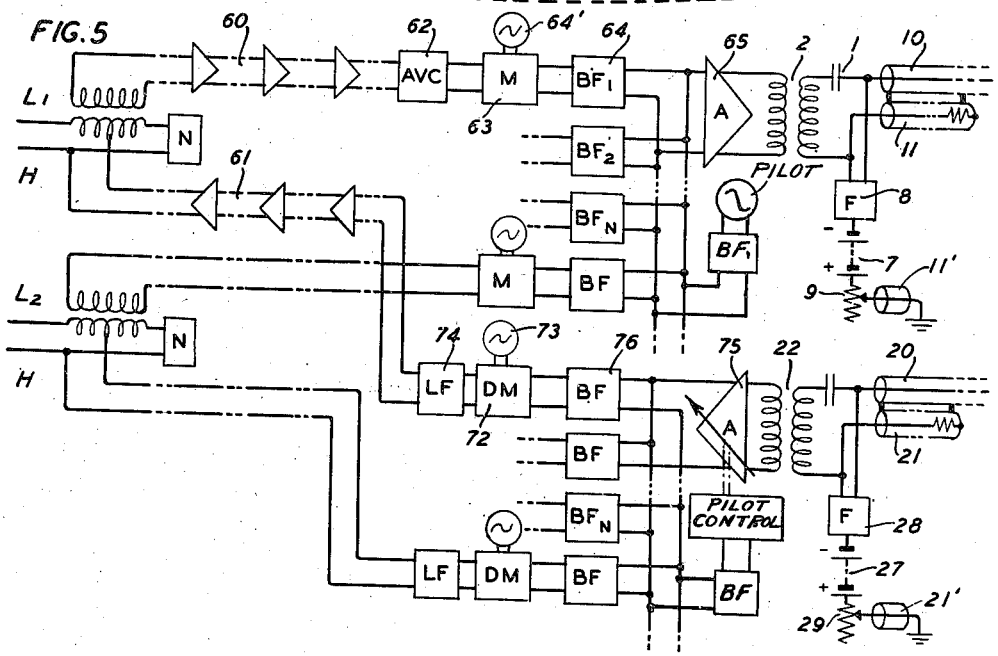
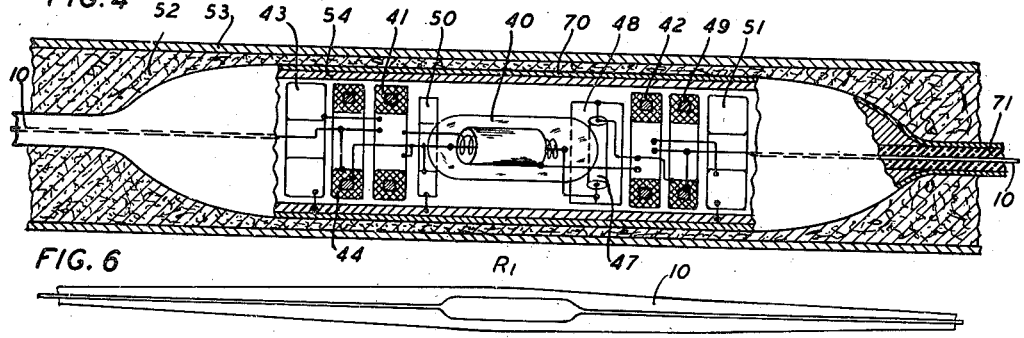
INVENTORS: O. E. BUCKLEY
O. B. JACOBS
BY
ATTORNEY Nov. 12, 1935.  O. E. BUCKLEY ET AL  2,020,297
SUBMARINE CABLE TRANSMISSION
Filed Oct. 6, 1933  4 Sheets-Sheet 4

INVENTORS: O. E. BUCKLEY
O. B. JACOBS
BY
ATTORNEY

Patented Nov. 12, 1935

2,020,297

UNITED STATES PATENT OFFICE 2,020,297

SUBMARINE CABLE TRANSMISSION

Oliver E. Buckley, Maplewood, and Oliver B. Jacobs, Morristown, N. J., assignors to Bell Telephone Laboratories, Incorporated, New York, N. Y., a corporation of New York Application October 6, 1933, Serial No. 692,370 In Great Britain September 1, 1933

31 Claims. (Cl. 178—63)

This application is in part a continuation of our application Serial No. 681,512, filed July 21, 1933.

The present invention relates to long distance transmission of intelligence by wire and particularly across a great, relatively inaccessible space such as the ocean. The invention will be illustrated and described herein as applied to a deep-sea cable system, such for example, as might be used to connect America with Europe for telephony and other types of transmission. It will be evident as the description proceeds, however, that the invention in certain of its aspects and features is not limited to the types of transmission system that have been indicated but is capable of other applications quite different from those mentioned.

An object of the invention is a novel method of and means for amplifying or replenishing signal energy along a transmission path or conductor, especially suitable for long distance transmission such as over a deep-sea cable. A related object is a novel cable construction by which the foregoing object may be realized.

The most satisfactory amplifying device for telephony and kindred types of transmission is an electric space discharge device. This type of apparatus has always been thought of as inherently fragile and relatively short-lived. Even where individual tubes may have survived several years of use, others of the same type have generally failed after varying periods of service, some much shorter than could be expressed in years. Where amplifiers of the thermionic type have been considered for application to a deep-sea cable intermediate its ends, it has been thought a practical necessity to locate the repeaters where they would be accessible for attention and service, such as on islands, natural or artificial, or on buoys or some type of suspension systems. In all such proposed installations, the thought has been that periodic inspection, with possible replacement of batteries or tubes at intervals of a year or less, would be necessary.

On account of the necessity for frequent inspection and replacements in such systems, an important consideration has been to keep the number of repeater stations as small as possible. Also, it was reasoned that the fewer the tubes used the smaller would be the liability of some one of the tubes failing. From such considerations, systems of this sort were envisaged as comprising repeater stations of minimum number with consequently relatively high amplification at each repeater, consistent with the other factors of the problem.

The present invention represents a radical departure from such prior art proposals. The present invention is based, in part, on the observation that the proverbial shortness of the life of a vacuum tube is due largely to operation of the tube to give considerable output power, but that if tubes are operated at filament temperatures and power outputs of a lower order of magnitude than is standard for amplifiers, their life can be greatly prolonged. This being the case, two important corollaries follow: (1) the periodic service of repeater stations can be made much less frequent or dispensed with entirely for, say, the life of a cable, and (2) increase in the number of repeater stations on a cable does not unduly increase the chance of tube failure because of the greatly increased dependency that can be placed on individual tubes when operated in the above manner to prolong their life. With these two important conditions realized, there is no objection to the use of a large number of low output power level amplifying repeaters and these can be of such simple construction as to enable them to be laid and recovered with the cable. The invention, in fact, comprises as one main feature the incorporation of the repeaters as an integral part of the cable and in the case of an armored cable preferably inside the armor.

A further feature of the invention is the use of repeaters of simple construction, comprising, say, one or two tubes, placed at sufficiently short intervals so that their amplification is adequate to compensate substantially for the attenuation of an adjacent section of the cable.

Assuming a vacuum tube repeater with suitable input and output transformers and equalizing networks, such a repeater could be operated at an input level limited by thermal interference, band width, number of repeaters and the desired margin between signal and noise. With a suitable gain and with an adequate allowance for departures from initial operating conditions, the necessary output power of the repeater would be in the order of $10^{-5}$ or $10^{-6}$ watts. To secure adequate amplification without objectionable modulation, a power of perhaps $10^{-3}$ or $10^{-2}$ watts would have to be supplied to the plate. It would be desirable to supply this power at relatively low voltage to simplify the problem of power supply. Assuming that 30 volts would be adequate for the plate circuit, a plate current of the order of $10^{-4}$ ampere would be required. With such a low plate current, a relatively low filament temperature can be used. An added advantage of using low plate current is that at least in the case of coated filament tubes, the life is increased if they are operated with a plate current such that the amount of current drawn per unit of filament area is small. There are several other advantages of using low filament temperature and low plate current, among which may be mentioned a smaller tendency to produce gas in the tube and less alteration of the nature of the surface of the tube elements with time, and because of these effects, a greater constancy in the tube characteristics.

Recent improvements in vacuum tube design, particularly design of the filament or cathode, enable a great increase in life to be realized. As an example, such tubes and their method of manufacture are disclosed in United States applications for Letters Patent by C. H. Prescott, Jr., Serial No. 678,347, filed June 30, 1933 and by Wilson, Acker, Hartman, Serial No. 678,426, filed June 30, 1933 (French Patents 769,678 and 768,-485). The present invention contemplates use of the structures (and methods) disclosed in those applications and it is intended that the disclosures of those applications constitute a part of the disclosure of the present application as in part showing one manner of carrying out the present invention in practice. While the disclosure of those applications is not repeated herein, reference may be made to them for the subject matter which they contain. A feature of the tube structure disclosed in those applications is such a construction and treatment of the cathode that a large storage supply of the appropriate materials for continuous cathode emissivity is incorporated in the cathode so that the active and useful life of the cathode can be greatly prolonged. With tubes constructed as disclosed in the two applications referred to and operated at low filament temperature and plate voltage in accordance with this invention, a tube life of the order of 20 years or longer can reasonably be counted on.

The tubes are made rugged mechanically by keeping them of simple construction. The number of welds is kept at a minimum. The bulb is made small and may be either spherical or cylindrical or of modified form to suit space requirements. The bulb may be made of metal or any other suitable material.

The use of a low level output repeater with the small tubes and coils which the operation at low power makes practical, permits a housing of much smaller volume than would be requisite for a relatively high output power repeater. Careful experimental study shows that the repeater structure may be made so small that its complete housing can be incorporated within the cable so that the cable may be laid and lifted with ordinary cable laying machinery and technique.

A suitable housing for a repeater is a steel cylinder of perhaps two inches internal diameter and about 18 inches long with a wall thickness of about one-half inch, giving an external diameter of about three inches. The leads from each end of the cylinder are in the form of ordinary cable core, suitable insulation of the lead-in wire being provided so that no diffusion of moisture into the container is possible. Over the repeater housing itself and extending from several feet over the cable core, a filler of suitable material serves to make a smooth, flexible, tapered structure and at the same time to protect the core. A unit consisting of the repeater housing with its associated connecting core and filler is joined between two sections of cable in the same manner in which a cable splice is ordinarily made, the armor from each cable section being passed over the repeater housing and bound to the cable on the opposite side. By this means double strength of armor is secured at the repeater and the whole cable may be handled with the repeater in place, much as cable is ordinarily handled.

No attempt is made here to state any limiting values as to size of cable or other equipment since these may be varied widely to suit conditions. As an illustrative example, however, let us take the case of a cable 2000 miles long. We will arbitrarily choose a cable of the same size as the new Key West-Havana cable. Such a cable has a direct current resistance of 2.2 ohms per nautical mile and an attenuation at 40,000 cycles per second of .885 decibel per nautical mile. Allowing 30 decibels attenuation for each repeater section except the first, we will require 56 repeaters beginning with the first one 100 miles from shore at the sending end, and successive repeaters spaced at intervals of 33.9 miles.

Even assuming as high a current over the cable as 0.2 ampere, the total drop in potential over the cable conductor due to this current would be only $2000 \times 2.2 \times .2 = 880$ volts. Allowing 30 volts drop at each repeater to provide for filament and plate voltage gives $30 \times 56 = 1680$ volts for the repeaters. The total voltage drop for the system will then be 2560 volts. By applying one-half of this voltage at each end, the extreme voltage of the cable conductor to earth would be 1280 volts. This voltage would exist only at the ends of the cable and would decrease to zero at the middle. It is considered that a voltage of this order of magnitude is well within the safety limits of a suitably constructed cable.

Two cables of this type would provide a number of telephone circuits operated on a carrier basis, using one cable for each direction of transmission. Any portion of the frequency range could be used for telegraph, program work, picture transmission or any form of communication for which it may be adapted. One cable operated on a carrier basis can be used to provide several two-way telephone circuits, as will be described.

Loading may be used but is not necessary. The loading, if used, might need to be very light in the case of a cable operating at the high frequencies required for multiplex carrier telephony. Where loading can be used in any case to advantage, the low level transmission practised in accordance with the invention is an advantage in view of the resulting low modulation in the loading material. Examples of loading materials that may be used are alloys of nickel and iron or nickel-iron compounds including a third or other metals, such as are now well known in the art and are disclosed, for example, in United States Letters Patents to Elmen Nos. 1,715,541 and 1,715,647 both dated June 4, 1929 and 1,768,237 dated June 24, 1930 and to Goldschmidt 1,801,150, April 14, 1931. The invention contemplates the use of the loading materials disclosed in the foregoing patents or other suitable materials.

The various objects and features of the invention as well as the preferred manner of carrying it out in practice will be better understood from the following specification including the drawings forming a part thereof, in which Fig. 1 shows in simplified diagrammatic form, in general outline, a one-way cable including repeaters and partial terminal circuits according to the invention, certain detail modifications being shown in Figs. 1A and 1B;

Fig. 2 is a similar showing of two oppositely directed one-way cables, used so as to provide two-way transmission;

Fig. 3 shows a circuit schematic of a repeater suitable for use in the cables of Figs. 1 and 2;

Fig. 4 shows in part section the mechanical construction of a repeater such as is shown in Fig. 3;

Fig. 5 is a schematic of a terminal circuit for a system comprising two one-way cables arranged for two-way carrier transmission;

Fig. 6 is a reduced size showing of a repeater within the cable structure;

Figure 9:
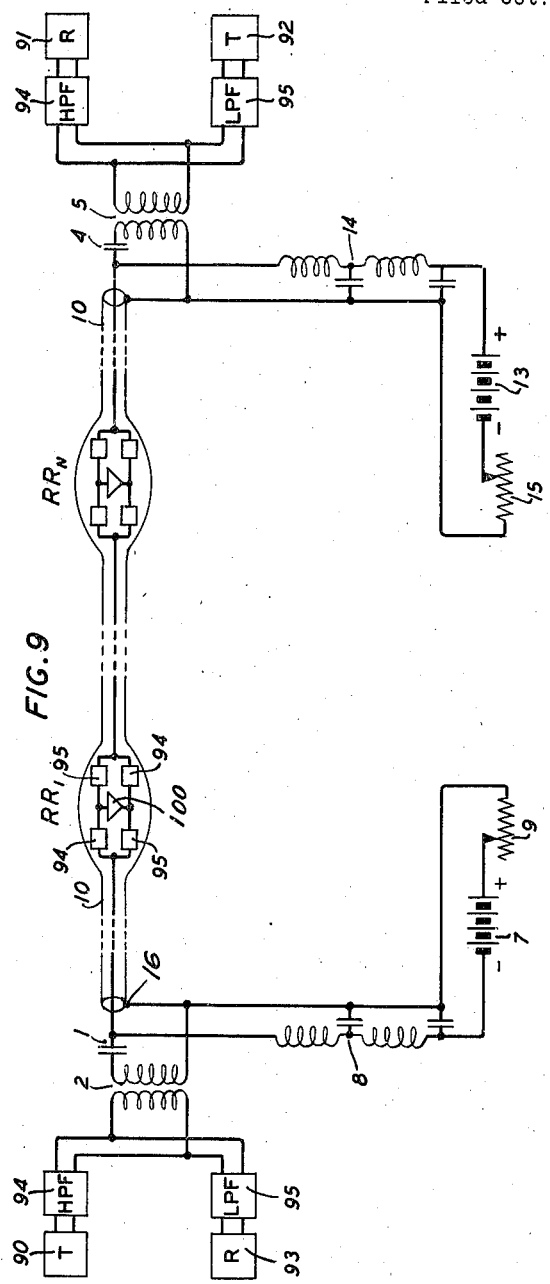
Figure 10:
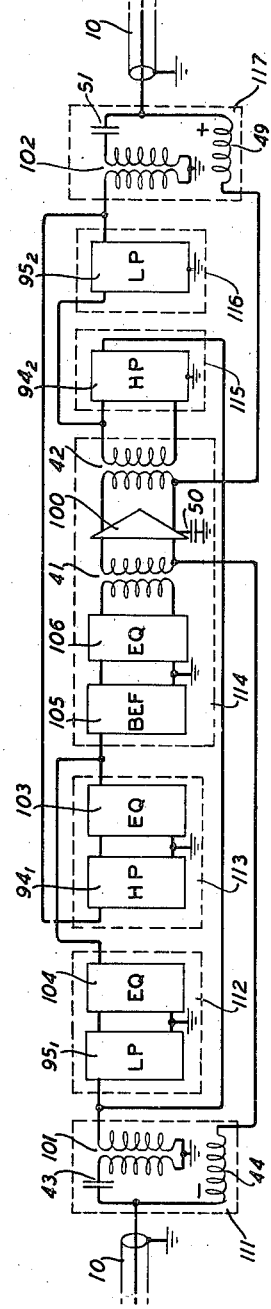

Fig. 7, analogous to Fig. 1, shows in simplified diagrammatic form a twin-core cable using repeaters according to the invention;

Fig. 8 shows a circuit schematic of one of the repeaters of Fig. 7;

Fig. 9 is a simplified diagram, analogous to Fig. 1, showing a cable equipped for two-way carrier transmission and including intermediate repeaters according to the invention;

Fig. 10 shows in block diagram the circuit schematic of one of the repeaters of Fig. 9; and Fig. 11 shows how a repeater may be mounted in a series of containers within a cable armor.

In Fig. 1 the deep-sea cable 10 is indicated as having a number of one-way repeaters $R_1$ to $R_N$ incorporated within the cable armor. At the west terminal (at the left) the cable is connected through a capacity 1, secondary winding of sending transformer 2 and to return conductor 16. The nature of the transmitting circuits connected to the primary of transformer 2 is not indicated in this figure but will be given in connection with Fig. 5.

The east (right hand) terminal is similar and includes capacity 4 in series with primary of receiving transformer 5 the secondary of which is connected to receiving lines as will be described in connection with Fig. 5.

Bridged between the cable core and the return conductor 16 at the west station is a source of steady direct current, shown as battery 7, in series with a filter 8 and regulating resistance 9. Source 7 has its negative pole connected to the cable core.

At the east station a similar source of voltage 13 is bridged from the cable core across to the return conductor 16 but is poled in series aiding with respect to source 7 by having its positive pole connected to the cable core. Filter 14 and regulating resistance 15 are included. Filters 8 and 14 prevent the signal currents from passing into the direct current energy supply path, the signals being caused to traverse the condensers 1 and 4 and winding of respective terminating transformer 2 or 5, and through return conductor 16.

In the operation of the system of Fig. 1, current supplied by sources 7 and 13 in series flows over the cable 10 and at each repeater point $R_1$—$R_N$ it supplies cathode heating current and anode voltage to the repeater tubes, in a manner to be described more fully hereinafter. By means of regulating resistances 9 and 15, this current may be held constant at the value best suited to the tube operation, or may be changed to meet changing conditions on the cable. These resistances afford a means of controlling the gain of the repeaters since the voltage impressed on the cable determines the filament temperature and anode voltage, and grid bias voltage. If desired, the current can be automatically held constant, one means being by the use of a space discharge device as the variable series resistance 9 or 15 connected in circuit in the manner disclosed in United States Patent to Wold 1,438,976, December 19, 1922, Fig. 1.

Such a circuit is shown in Fig. 1A where there is substituted for the portion of Fig. 1 to the right of the broken line 1A—1A the circuit of Fig. 1A. The tube 21' corresponds to tube 21 in the Wold patent, and the other primed numbers likewise correspond to the unprimed numbers in that patent in their identification of corresponding circuit elements. As explained in the patent an increase in current flow increases the potential drop across portion 26' of resistance 20' thus making the grid more negative with respect to the cathode, and this in turn increases the impedance of the tube 21' thereby opposing the assumed increase in current. A decrease in current similarly acts to decrease the impedance of tube 21'. The net effect is to hold the current at a nearly constant value.

Waves to be transmitted over the cable are impressed on the primary of sending transformer 2. These waves may be speech waves, carrier telephone or carrier telegraph waves, television signals or any other desired type of intelligence-conveying waves. Sufficient initial amplification may be given to these waves so that the first repeater $R_1$ may be placed out at considerable distance from shore, for example, several times as far as the distance between adjacent repeaters $R_1$ to $R_2$, etc. The received waves at the eastward end of the system pass through the primary of receiving transformer 5 and thence into a suitable type of receiving circuit. Wherever the cable passes through a zone of extraneous interference, such as may be encountered in shallow water, for example, the repeaters in such zone may have higher output power capacity in order to keep the signal energy above the noise by suitable margin. The last repeater or last few repeaters preceding such zone may have higher output power capacity and may have higher gain or closer spacing or both. This is especially the case near the shore at the receiving end. After a zone of interference has been traversed and the cable continues on, the next succeeding repeater section may be longer.

In practice it will be usual to employ an eastward circuit together with a westward circuit in order to permit of two-way operation. In Fig. 2 these two oppositely directed circuits are shown in the form of separate cables 10 and 20, each incorporating one-way repeaters. The cable 10 may be as already described in connection with Fig. 1 and the cable 20 may be similar and may include a similar number of repeaters $2R_1$ to $2R_N$. In this figure instead of connecting the positive pole of battery 7' to the return conductor, it is connected, through a second regulating resistance 29 if desired, and through a second filter 28 to the opposite cable 20. Similarly, at the opposite end of the system the battery 13' has its negative pole connected to the cable core 20. The direct current voltage for energizing all of the repeaters of the system is therefore obtained from batteries 7' and 13' in series with each other and with the two oppositely directed cables. In this figure, instead of connecting the circuit terminals between the cable core and the return conductor, they are shown terminated respectively in sea earth conductors 11 and 12, for cable 10, and 21 and 22' for cable 20, these leading to terminating resistances 3, 6 and 3', 6' respectively. Sources 7' and 13' may either or both have an adjustable intermediate point grounded to facilitate fixing the direct current potentials of the system with respect to earth.

Transmission takes place as in the case of Fig. 1, over cable 10 in the eastward direction from the sending transformer 2 to the receiving transformer 5. Transmission in the opposite direction takes place over cable 20, the sending transformer being shown at 25 and the receiving transformer at 22.

The circuit diagram of Fig. 3 is intended to represent a type of circuit that may be employed in any one of the repeaters, for example, R₁. It comprises a single amplifier tube 40 having an input transformer 41 and an output transformer 42 for coupling the tube between two sections of the cable 10—10. The signal wave path for the primary of transformer 41 is in series through condenser 43 and to the return conductor. Similarly, the output secondary circuit of transformer 42 for speech or signal waves includes condenser 51 and the return conductor. A direct current path is provided between the two sections of the cable 10 in series through choke coil 44 which acts as the choke impedance to the signaling waves, grid bias resistor 45, filament of tube 40, space drop resistor 47 and signal choke 49 which may be similar to 44. Direct current from the terminal sources traversing the circuit just traced furnishes heating current for the cathode of tube 40, and space voltage due to the drop of potential across resistor 47. It also supplies grid bias for the tube due to the drop across resistor 45 shunted by condenser 46, although at low input signal amplitudes it may be found permissible to omit the grid bias resistor and condenser 46 in some cases. By-pass condenser 48 around resistor 47 affords a low impedance path for the signal waves that are being amplified. Condenser 50 is connected between the cathode and return conductor and affords a low impedance path for such portion of the signal currents being amplified as may pass through inductance 49, thus reducing the coupling between the output and input circuits of the amplifier.

The manner of associating the elements of the circuit of Fig. 3 with the cable inside of the armor is illustrated in Fig. 4 where the various parts are identified by the same reference characters as are used in Fig. 3. No attempt is made in this figure to show detailed mechanical construction of the various elements and these may be varied within wide limits. This figure is for illustrative purposes to show one way in which the repeater elements may be arranged. In order not to complicate the drawing the means for mounting the various elements have been omitted in this figure. Various types of mechanical supports might be used such, for example, as blocks or washers of resilient material for the tube 40 and possibly certain of the other elements together with means for securing the various pieces of apparatus to the steel cylinder 54 to prevent displacement while providing the necessary insulation. The armor is indicated at 53 and between the armor and the metal case 54 is a filling 52 of jute or some other suitable type of material such as used in submarine cables, and one or more layers of impervious material such as lead. The dimensioning and general construction of the cable itself between repeater points may follow closely accepted prior art practice.

It is desirable that the repeater and repeater housing be of such size, form and material as to conform as closely as possible to such prior art cable practice.

In the drawing of Fig. 4 the grid leak resistor 45 and by-pass condenser 46 have been omitted as not being necessary in all cases. These elements, however, may be included similarly to the other elements that are shown.

As shown in Fig. 4, the steel cylinder 54 is provided with tapered end portions through which the cable core passes. Within these end portions suitable sealing means such as glands may be used to insure against the possibility of entrance of moisture into the casing. Preferably, a lead sheath 70 is formed over the entire exterior surface of the casing and is continued out over the cable core 10 and its surrounding insulation 71 for a distance of several feet each side of the repeater. This layer preferably consists of a material known in the art as "Paragutta" comprising essentially the unified hydrocarbons of balata (or gutta percha) and of rubber together with minor quantities of waxes to modify the mechanical characteristics, and it is highly impervious to water. As shown in the broken-away portion of one end of the casing, this insulation extends for a considerable distance into the end portion of the casing and forms a separation between the core and casing up to the point where the glands mentioned above are located. The entire construction is such that any moisture before it could enter the casing must first traverse a long length of cable underneath lead sheath 70 and thence the glands in the end portions of the casing. This construction affords a high degree of protection against such a possibility.

Between lead sheath 70 and the armor 53 there may be one or several layers of suitable material such as jute 52 filling all the intervening space and permitting a very gradual taper in the exterior of the cable for long distance each side of the repeater as indicated in Fig. 6.

Preferably, a copper tape or other return conductor is used. This may surround the insulation 71, and may be stopped at the point where the lead sheath begins near each repeater as above described, and the lead sheath may continue as the return conductor in the vicinity of the repeater, or if desired the return conductor may extend as far as the repeater.

One or more heat insulating partitions may be used to separate the interior of the cylinder into compartments. In Fig. 4, for example, such a partition (not shown) may be placed between the resistor 47 and the coil 42 to protect coil 42 and other apparatus to the right of it in the figure from heat developed in restor 47. Other partitions may be placed where required.

The construction shown in Fig. 4 as above described in detail is to be taken as illustrative rather than limiting since various constructions within the scope of the invention are possible.

Referring to Fig. 5, the east cable 10 and the west cable 20 are shown at the right of the figure, terminating respectively in a transmitting transformer 2 and a receiving transformer 22. The construction and arrangement of the cables 10 and 20 may be as shown in Fig. 2, but a slight modification is shown in Fig. 5 by way of illustration. In this figure instead of connecting the positive side of source 7 to the cable 20, it is connected to a short earth conductor 11' and the same type of connection would be used at the opposite terminal for the source 13, not shown in this figure, but poled to aid source 7. Similarly, the battery 27 for the cable 22 has its positive side connected to an auxiliary cable 21' leading to earth. Otherwise, the cables 10 and 20 together with their terminal circuits are the same as in Fig. 2, with the further exception that the direct currents flow over both cables in the same direction. This is permissible since there is no necessary relation between the direction of flow of the direct current and the direction of signal transmission over the cable. The repeaters must, however, have direct current of the proper polarity applied to them since, as is well understood in the art, the anode of a tube must be positive with respect to the cathode. Where as in Fig. 5, the terminal batteries for cable 20 are reversed from those for the cable 20 of Fig. 2 it is necessary to reverse the direct current connections to the repeater tube inside each of the repeater casings on this cable, such that the direct current flowing over the cable will make the repeater anodes positive with respect to their cathodes. To adapt the circuit of Fig. 3 to use on cable 20 of Fig. 5 with the batteries poled as shown, for example, the negative potential appearing at the lefthand terminal of retard coil 49 (in this case) is applied to the grid end of resistance 45 while the positive potential appearing at the right-hand terminal of retard coil 44 (in this case) is applied to the plate end of resistor 47. In other words the leads from the retard coils 44 and 49 to the amplifier circuit are interchanged.

A number of circuits lead up to the cable terminal for connection to it. An illustrative arrangement is shown. Considering circuit $L_1$, this may be a land line and is provided with the usual hybrid coil H and balancing network N for connecting to a four-wire line comprising eastward branch 60 and westward branch 61. It will be understood that the exact type of line circuit or interconnecting circuit between the land line and the cable station may be varied widely to suit actual requirements, the arrangement shown being one form contemplated by the invention. The lines 60 and 61 include one-way repeaters as is common in four-wire practice. The line 60 leads at the cable terminal station first through an automatic volume control 62 and then to a modulator 63. The volume control 62 provides a substantially constant input volume for the modulator 63 for varying inputs due, for example, to connection to different lengths of lines or to differences in volume of subscribers' speech. Modulator 63 is provided with a carrier source 64' of any desired type. It is assumed that the modulator 63 is of the well known balanced type which suppresses the unmodulated carrier component in the output. Band filter 64 eliminates one of the two resulting side bands so that only the remaining side band for this channel is transmitted. The resulting side band is impressed on the input side of transmitting amplifier 65 so that the side band is raised to the requisite level before it is actually impressed upon the cable 10. The amplification at this point may, for example, be sufficient to give the signal currents a volume of the order of several watts, so that the first repeater in the cable can be located a considerable distance from the shore end.

A carrier side band received from the distant terminal over receiving cable 20 is amplified by the common receiving amplifier 75 and is selectively transmitted through the appropriate band filter such, for example, as 76 and impressed on demodulator 72 which is supplied with carrier from a local source 73. As the result of the well known action of demodulator 72, a voice frequency band is produced from the received side band and is transmitted through low-pass filter 74 and impressed on line 61 leading to the circuit $L_1$. Thus a subscriber connected to $L_1$ talks in the eastward direction over line 60 and cable 10 in tandem to the distant terminal on the opposite side of the ocean and receives from that point over cable 20 and receiving side 61 of the four-wire line, the transmission in both directions taking place through the intermediary of the carrier terminal apparatus that has been described for this channel. Transmitting amplifier 65 and receiving amplifier 75 are each common to all of the carrier side bands used for transmission in the respective directions. These amplifiers accommodate the entire frequency range which may, for example, extend from ordinary speech frequencies up to the order of 40 kilocycles.

Other band filters are shown connected to the input side of power amplifier 65 and it will be clear from so much of the circuits as have already been described that each of these filters may co-operate with a speech transmitting circuit in the same way that filter 64 cooperates with line 60. Similarly, the receiving band filters shown connected to the output side of receiving amplifier 75 may lead to any suitable type of low frequency lines such as the line 61 through the intermediary of suitable demodulating apparatus such as that shown for this line.

Line $L_2$ may be another speech line, but is intended to represent a voice frequency carrier telegraph line having provision for transmitting the order of 10 or 12 channels of carrier telegraph within the usual voice frequency range. As illustrated in the figure, it may be associated with the transmitting cable 10 and the receiving cable 20 in exactly the same manner as is the voice line $L_1$.

One of the channels may be set aside, or an additional channel may be provided, for transmitting a pilot frequency wave over the system to control the gain of an amplifier, e. g., amplifier 75, as shown, at the receiver in accordance with changes in attenuation of the system. The manner in which the gain of the receiving amplifier is varied is not shown but may be of any suitable or well known type such as that disclosed in United States Patent 1,447,773 to Espenschied and Bown granted March 6, 1923.

Preferably, but not necessarily, the pilot frequency is higher than the frequencies used by the carrier telephone channels.

In addition to controlling the receiver gain, the pilot channel may also control the direct current supplied to the cable and thus regulate the gain all along the line at the various repeater points. In the Espenschied et al. patent referred to, a motor is used to control the adjustment of a potentiometer for controlling the receiver gain. In adapting that system to the system disclosed in Fig. 1 of this application, a similar control of the receiver gain would be used and the same motor would also be adapted to control the resistance 15 of Fig. 1. Resistance 9 would in that case be given a fixed adjustment and all of the regulation of the direct current would be made by controlling resistance 15. The rate of change of resistance 15 to provide proper regulation would be accomplished by use of suitable gear ratio between the motor and the mechanism for moving the slider along resistance 15.

Reference is made to Fig. 1B for a circuit diagram of the type of control described in the preceding paragraph. Receiving amplifier 75 (see Fig. 5) leads to band filters BF one of which passes the pilot frequency to detector D corresponding to the detector or rectifier in the Espenschied et al. patent. Detector D controls the action of the motor control device in accordance with the strength of the received control frequency wave. The motor control circuit starts and stops the motor 26' and determines the direction of its rotation. The motor shaft moves arms over respective potentiometer resistances 12' and 15 through switch gearing if required. If the strength of the received control wave is too low, resistances 12' and 15 are varied to raise the gain of amplifier 75 and of all of the repeaters on cable 10 until the control wave is received at normal strength. If the control wave as received is too strong, the reverse change is made in resistances 12' and 15.

It is to be understood that amplifiers may be inserted in the terminal circuits of Fig. 5 wherever necessary, and ordinarily each receiving channel will contain one or more amplifiers. Equalization for variation in attenuation over the total frequency range may be accomplished in part by controlling the gain in individual channels. In addition, equalizer networks may be used. Also an automatic volume control may be used on the receiving side as well as on the transmitting side.

One advantage of the automatic current regulator for the direct current applied to the cable from the terminal sources is that earth currents may be set up in the cable and the constant current regulator will tend to compensate the effect of these earth currents on the cable transmission.

The repeaters used in the cable may include transmission equalizers and in addition may be designed to compensate for the unequal attenuation of the cable over the transmitted frequency range. For example, each element of the repeater that influences the frequency amplitude characteristic of the repeater circuit may be designed to contribute to this compensation. In particular the condensers 43 and 51, the ratios of transformers 41 and 42, the effective shunt capacity of the input coil, the effective input capacity of the amplifier tube, and the inductances of the transformers 41 and 42 are the principal elements of the repeater circuit that would ordinarily be designed to cooperate in effecting the compensation. In addition, as stated, a suitable equalizer network may be used, included within the repeater housing. This may be, in some cases, of very simple construction such as an inductance and resistance in series with each other bridged across the primary winding of the input transformer of the repeater.

Fig. 7 is similar in general outline to Fig. 1 but uses a twin-core cable 110 instead of the single-core cable 10. Batteries 7 and 13 and resistances 9 and 15 may be the same as in Fig. 1 but the direct current for energizing the repeaters R'₁ to R'ₙ is supplied over the twin cores in parallel from center taps on the appropriate windings of repeating coils 2' and 5', these latter corresponding to coils 2 and 5, respectively of Fig. 1. By this arrangement the condensers 1 and 4 of Fig. 1 are dispensed with and it will be shown later that corresponding condensers at repeater points are likewise unnecessary.

The twin cores 78 and 79 are illustrated as two similar cores within the same armor and extending side by side throughout their length. They may have any other suitable form and arrangement, however. For example, they may be concentric conductors separated by suitable insulation and insulated from ground.

Fig. 8, analogous to Fig. 3, shows the schematic of any one of the repeaters of Fig. 7, such as repeater R'₁. Identical parts are indicated by use of the same reference numerals in the different figures. Transformer 81 differs from transformer 41 in having a primary center tap connected to choke coil 44. A similar difference exists at the output where transformer 82 has a secondary center tap connected to choke coil 49. By virtue of the twin-core construction both the signal waves and the direct current energy are sent through the proper paths at the repeater without the use of the condensers 43 and 51 of Fig. 3. Also, in the case of a cable structure in which the two conductors have the same impedance to ground, either or both retard coils 44, 49 may be omitted. In Fig. 8 the inner end of inductance 44 (remote from the cable) is shown connected to the grid side of resistance 45 and the inner end of inductance 49 is shown connected to the plate side of resistance 47. These connections are correct for the repeaters of Fig. 7 with the battery polarities indicated. If the battery polarities should be reversed, however, the direct current connections from inductances 44 and 49 to the tube circuit would need to be reversed and alternate strappings for this purpose are shown on Fig. 8 such that the conductor from coil 44 would lead to the plate terminal of resistance 47 and the conductor from coil 49 would lead to the grid end of resistance 45, as explained above in connection with Figs. 3 and 5.

The operation of a system according to Figs. 7 and 8 is in general similar to that of the previous figures. Speech, speech-undulated carrier waves or other waves to be transmitted are impressed from suitable terminal apparatus or circuits on coil 2' and set up corresponding voltages between the cores 78 and 79 of the cable 110, causing currents to flow in the series metallic circuit formed by these cores and their terminating circuits. At the same time energizing current for the repeaters flows from batteries 7 and 15 (or other sources) over both cores in parallel by virtue of the connection to the midpoints of the windings of the various transformers 2', 5' and those at the repeater points such as 81 and 82 of Fig. 8.

All that has been said above as to the regulation, equalization, gain, energy level of the repeaters, their spacing and other general operating characteristics is applicable to the twin-core case. Also it will be understood that the repeaters R'₁ etc. may be included structurally within the cable armor in the same general way as indicated in Fig. 4 or any other suitable manner. Loading as generally discussed above may likewise be applied to the twin-core cable.

Analogous to Figs. 2 and 5, two twin-core cables as described above may be associated to form a two-way system for two-way operation between given terminal circuits.

Fig. 9 shows a cable with repeaters RR₁ to RRₙ and terminal circuits capable of giving two-way operation over the same cable, 10. Several of the elements are identical with those of Fig. 1 as is indicated by use of the same reference characters. Transmission eastward from transmitter 90 to receiver 91 is effected by use of a higher frequency carrier range while transmission westward from transmitter 92 to receiver 93 is accomplished by use of a lower frequency carrier range. Subdivision of the two ranges is made at the terminals by filters 94 and 95, the former being high-pass and the latter low-pass filters. A similar use of filters is made at the repeater points to provide two paths through the repeater which are either separate and distinct throughout if two separate amplifiers are used or are separate and distinct except for a common portion including the amplifier element in case a common amplifier element is used. These filters and an amplifier element 100 are indicated in the repeaters $RR_1$ etc. of Fig. 9.

The carrier transmitting circuit 90 may comprise a group of transmitting channels similar to the higher frequency half of those contemplated in Fig. 5 connected to the input of amplifier 65 of that figure, and may terminate in low-frequency circuits or apparatus as in Fig. 5; or they may be of any other suitable type and arrangement. They may operate, for example, within the frequency range of 24 to 40 kilocycles to provide four one-way carrier telephone channels. The carrier transmitting circuit 92 may be similar to circuit 90 as described above but designed to operate within, for example, the frequency band of 4 to 20 kilocycles to provide four one-way carrier telephone channels.

The receiver circuit 91 may comprise a group of receiving channels similar to the higher frequency half of those contemplated in Fig. 5 connected to the output of amplifier 75 of that figure; or they may be of any other suitable type and arrangement. They operate, of course, in the same frequency range as transmitter 90. Receiving circuit 93 may be similar to receiving circuit 91 but operates in the same frequency range as transmitter 92.

In the operation of the system of Fig. 9, signal waves from transmitter 90 pass through high-pass filter 94 and through repeating coil 2 and are impressed between the core of cable 10 and the return conductor 16, this circuit including condenser 1. On reaching a repeater point they pass selectively through high-pass filter 94 (at the left) through amplifier element 100 by which they are amplified to increase their energy content, through filter 94 (at the right) and thence on to the next section of cable. In the same way they pass through each succeeding repeater and upon arrival at the distant terminal they traverse condenser 4 and repeating coil 5 and filter 94 into carrier receiving circuit 91.

In analogous manner waves originating in transmitter 92 traverse the path through filters 95 at the terminals and repeater points, and are amplified by amplifier elements 100 and are finally impressed on carrier receiving circuit 93.

The amplifiers are, as in the case of Fig. 1, energized by current sent over the cable from sources 7 and 13.

The circuit of the amplifier $RR_1$ is more fully disclosed in Fig. 10 in which the repeater element 100 may be identical with that of Fig. 3 and is supplied with energizing current through retard coils 44 and 49 (the elements 45, 46, 40, 47 and 48 being assumed present in the element 100). In Fig. 10 one side of the circuit is indicated as "ground" and would in practice be some conductive element such as the steel housing, lead sheath, copper return or other metallic member having a good connection to the return conductor of the cable whether this be the cable armor and sea water or a metallic return.

The signal wave path beginning at the cable core at the left is through condenser 43, repeating coil 101 and to the input side of low-pass filter $95_1$ and the output side of high-pass filter $94_2$. The signal wave path beginning at the cable core at the right is through condenser 51, repeating coil 102 and to the input side of high-pass filter $94_1$ and the output side of low-pass filter $95_2$. Associated with each of the input filters $94_1$ and $95_1$ is an equalizer 103, 104, respectively, designed to compensate in part, at least, for the unequal attenuation of the cable section over the corresponding frequency band. The output sides of these equalizers join at the input to the common band elimination filter 105 which is designed to suppress frequencies between those utilized for transmission in the opposite directions. This filter may aid in sharpening the cut-offs of the grouping filters $94_1$, $94_2$ and $95_1$, $95_2$ permitting a simpler design of these filters. It will be understood that waves in both the high group and in the low group pass through filter 105 into the input side of amplifier 100. Equalizer 106, effective over the total range, supplements the action of equalizers 103 and 104. The amplified output waves are separated by filters $94_2$ and $95_2$. Those passed by filter $94_2$ are impressed through repeat coil 101 on the west cable section. Those passed by filter $95_2$ are impressed through repeat coil 102 on the east cable section.

In mounting the elements of the repeater $RR_1$, Fig. 10, it is preferable to place the elements in more than one container so as to avoid use of too long a casing. Fig. 11 shows the use of a succession of cylindrical casings 111, 112, 113, etc., each similar to the casing of Fig. 4 and spaced lengthwise of the cable inside the armor. This construction makes for greater flexibility in the cable. The dotted line enclosures of Fig. 10 are suggestive of one manner of subdivision and grouping of the elements for inclusion in separate enclosures. Seven such enclosures, 111 to 117, are illustrated although it will be understood that the number may be varied. Some of these enclosures are illustrated as containing relatively few elements, others as containing more. Cylinders of different lengths may be used for this purpose. The leads interconnecting apparatus in the different cylinders are brought out at each end of the cylinders in much the same way that the cable core is brought out in the construction of Fig. 4, and are of course insulated from one another and from ground. The grounds indicated in Fig. 10 may be connections to the walls of the cylinders, which in that case would be conductively connected together. Where leads extend from apparatus in one cylinder to apparatus in a non-adjacent cylinder, they are preferably carried through the intervening cylinder or cylinders rather than around them. A continuous, impervious sheath of lead or other suitable material (not shown) is placed over the exterior of all of the cylinders housing the elements of a repeater and is continued out in each direction from the repeater over the cable core and its insulation for a distance of several feet as shown and described in connection with Fig. 4.

In Figs. 9 and 10, the cable is shown as a single-core cable. It may equally as well be a twin-core cable, in which case the condensers 43 and 51 of Fig. 10 would be omitted, the transformers 101 and 102 would each have a winding connected between the two cores, similarly to transformers 81 and 82 of Fig. 8, and retard coils 44 and 49 would then each be connected to a center tap on such respective winding, as in Fig. 8.

The apparatus shown in a single container in Fig. 4 may be disposed in a plurality of separate casings in the manner shown and described in connection with Fig. 11.

No detail showing has been made of the high-pass and low-pass filters or the band elimination filter since they are well known in the art and may comprise any type of filter section suited to a particular case. The attenuation equalizers also may be of known type. The capacities and inductances used in these filters and the inductances used in the equalizers can be of any suitable physical form such, for example, as those shown in Fig. 4 and can be similarly mounted within a container or containers. The low power of the repeaters is favorable to the use of inductances of small space dimensions, since the low core modulation permits use of small cores. The cores are preferably composed of alloys of nickel and iron of high permeability such as those disclosed in the patents on loading materials above referred to. It is advantageous in order to be able to use smaller condensers occupying smaller space to step the impedance up in going from the cable into the repeater as a whole and in going from the common amplifier input branch into the input of the amplifier 100, although this requires the use of higher inductances than if the impedance were not stepped up. These inductances can still be of small space dimensions, however, on account of the low power output of the repeaters.

The use of repeaters at intervals along a long deep-sea cable in accordance with this invention greatly enlarges the message-carrying capacity of the cable and at the same time or alternatively permits a saving in the cost of construction of the cable itself. In the case of a deep-sea cable of several hundred miles length without repeaters, it would be a practical impossibility to transmit a wide enough frequency range to provide for several carrier telephone channels. Multiplex carrier telephone transmission over such a cable equipped with repeaters in accordance with the invention is, however, possible.

In designing a long deep-sea cable without repeaters, for transmitting a given frequency band, the total attenuation of the cable from end to end puts a lower limit on the size of cable and hence on its cost, since there is an upper limit to the allowable attenuation at the highest transmitted frequency. By using repeaters in accordance with this invention, however, it is the attenuation of a repeater section rather than the attenuation of the cable as a whole that must be considered and this can be controlled within limits by making the repeater sections shorter. This enables a relatively small high-resistance cable to be used to transmit a relatively wide frequency band.

It is to be understood that the invention, particularly in view of its basic nature, is susceptible of wide modification and variation. The specification discloses the preferred manner of carrying out the inventive idea in practice but nothing in the specific disclosure is to be taken as limiting the invention to the specific means shown and described since the scope of the invention is defined by the claims. Likewise, wherever numerical values have been given these are to be taken as illustrative rather than as limiting. While single-stage repeaters are disclosed, the invention is not limited to repeaters having only a single stage.

What is claimed is:

1. An armored submarine cable having a thermionic device for reducing its overall attenuation for signaling currents enclosed under the armor thereof.

2. A cable according to claim 1, in which the thermionic device is supplied with operating current over the cable from a potential source at the terminal thereof.

3. A cable according to claim 1, in which the thermionic device includes a heated cathode and a cathode-anode path, in which current for heating said cathode and supplying current to said path is supplied over said cable.

4. A submarine cable comprising a core surrounded by protective layers and an armor, a hollow casing included within the armor, a space discharge type repeater inside said casing and electrically connected to said core to amplify impulses sent over said core.

5. A cable system including two cables according to claim 1, in which two-way operation between terminal two-way circuits is secured by transmitting in one direction between said terminal circuits over one of said cables and in the other direction between said terminal circuits over the other cable.

6. A submarine cable for transmitting signaling currents including a signaling current repeater of the space discharge type, a housing enclosing said repeater capable of withstanding sea-bottom pressure, said housing being structurally secured to the cable and being comparable in thickness with the cable, whereby it is adapted to be laid and recovered with the cable, said repeater having electrical connection with the cable core for increasing the energy of the signal currents.

7. A submarine cable system comprising a cable with submerged space discharge tube repeaters connected therein at intervals along the cable for amplifying signal energy on the cable, said repeaters being located so close together that the attenuation of the cable section between adjacent repeaters at the highest transmitted frequency is as low as 50 decibels.

8. A deep-sea cable structure including a core and a surrounding armor, said structure incorporating within the armor a number of low-amplification space discharge tube repeaters connected to the core for amplifying signal energy traversing the core, the length of a repeater section being so short that the attenuation at the highest transmitted frequency is of the order of 50 decibels or less.

9. A deep-sea cable comprising tandem sections of cable having suitable core and protective armor, a space discharge amplifier connected between each cable section and the next to amplify signal energy traversing said cable, said amplifier being included in an elongated sealed container incorporated within the cable structure, the protective armor being continuous over the outside of said container.

10. A submarine cable in accordance with claim 9, in which each amplifier includes attenuation-equalizing means, compensating the unequal attenuation of the cable at different frequencies in the transmitted range.

11. A deep-sea submarine cable system comprising two cables of great attenuation, each transmitting in only one direction to constitute a two-way communication channel, said cables each including one-way submerged repeaters, characterized in that the repeaters in one cable are furnished with energizing current flowing in one direction and in the other cable with energizing current flowing in the other direction.

12. A submarine cable having a plurality of submerged repeaters operating in tandem supplied with energizing current from the cable terminals wherein, for stabilizing the overall attenuation or gain, current is supplied from a source under the control of a constant current regulator device whereby the algebraic sum of the currents supplied from said source plus earth currents remains constant.

13. As an element of an armored deep-sea cable, a metal housing included under the armor thereof and including a thermionic amplifying relay for relaying signaling currents from an adjacent section on one side thereof to an adjacent section on the other side thereof.

14. An arrangement in accordance with claim 13, in which the repeater includes a discharge device with input impedance devices for impressing potentials to be amplified thereupon and output impedance devices for drawing off amplified energy.

15. A submarine communication cable having a plurality of thermionic amplifying devices in tandem for the transmission of a plurality of carrier channels, and attenuation equalizing means for controlling the relative amplification of currents of different frequencies whereby the thermionic devices are enabled to suitably amplify the currents of all the channels.

16. A submarine communication system having means for the transmission of currents in different frequency ranges corresponding to a plurality of channels, and amplifying means for the currents of said channels, characterized in this, that a pilot channel is actuated under the control of energy levels in the cable to regulate the gain of the thermionic amplifiers.

17. A submarine cable system in accordance with claim 16, in which the pilot channel is connected to means for transmitting a pilot frequency at or above the highest communication channel frequency.

18. A deep-sea cable having a plurality of submerged space-discharge type repeaters spaced at relatively short geographic intervals of 20 to 200 nautical miles and each giving an amplification substantially equal to the attenuation of the cable length intervening between two repeaters throughout a range of frequencies used for signaling.

19. A repeater for insertion between two sections of a submarine cable for amplifying signals transmitted over the cable, comprising an elongated casing enclosing a space discharge device, leads adapted to be connected respectively to said cable sections and extending through opposite ends of said casing and electrically connected to said device within the casing.

20. A submarine cable having a core and an armor, an amplifying space discharge repeater adapted to be put down with the cable to the sea bottom, said repeater being electrically connected with the cable core to amplify signals transmitted over the cable and being enclosed in a housing mechanically secured to the armor.

21. A submarine cable according to claim 20 in which the cable is a twin-core cable and current for energizing said repeater is supplied over the two cores in parallel.

22. A submarine cable according to claim 20 comprising two oppositely directed repeating paths, including an amplifier, connected in said cable with mutually exclusive filters transmitting between the cable and the repeater mutually exclusive frequency bands for enabling two-way transmission over the same cable by use of currents in different frequency ranges.

23. A submarine cable system comprising a cable having a core and armor, means to transmit messages in opposite directions over said cable in different respective frequency ranges, a two-way vacuum-tube repeater electrically connected to the cable core to amplify signals transmitted in either direction thereover, filters, selective of the respective frequency ranges, connected between said repeater and the cable core, and housing means enclosing said repeater and mechanically secured to said armor and adapted to be put down to the sea-bottom with the cable.

24. A deep-sea cable having a plurality of submerged space discharge type repeaters spaced at relatively short geographical intervals of the order of 20 to 50 miles and each giving an amplification substantially equal to the attenuation of the section of cable between adjacent repeaters.

25. In combination, a twin-core submarine cable divided into sections, means to transmit signals over the metallic circuit formed by the two cores, a space discharge amplifier between sections of said cable, for amplifying the signals received over one section and impressing the amplified signals on the succeeding section, and means for supplying energizing current for said repeater over the two cores in parallel.

26. In combination, a submarine cable, means to transmit carrier waves over said cable in opposite directions, the carrier waves transmitted in one direction lying in a different frequency band from those transmitted in the opposite direction, a space-discharge-type repeater enclosed in a suitable housing mechanically secured to the cable and adapted to be laid and recovered therewith, and filter means associated with the input and output sides of said repeater for selectively passing the oppositely directed waves through said repeater.

27. In combination, a submarine cable divided into sections, thermionic amplifiers adapted to be put down to the sea bottom with said cable, said amplifiers being electrically included respectively between cable sections to amplify impulses received over a preceding section and impress them on a succeeding section, means to energize said amplifiers by direct current sent over the cable, means to control said current and means controlled by said current to regulate the gain of said amplifiers.

28. The method of operating a submarine cable having space discharge tube amplifiers effectively inserted therein at points along its length comprising energizing said amplifiers at low plate power of the order of $10^{-2}$ or less watts per tube and keeping the applied signal amplitude below a maximum resulting in the order of $10^{-5}$ watts ouput power per tube.

29. The method of operating a submarine cable system including a submarine cable divided into sections with a space discharge tube amplifier effectively inserted between sections and means to transmit signals over said cable in a plurality of channels, said method comprising energizing said tube at low plate power of the order of $10^{-2}$ or less watts and keeping the applied signal amplitude below a value such that the interchannel interference produced by use of said amplifier in common by said channels does not materially exceed noise in the system arising from other causes.

30. In a submarine cable system a number of space discharge repeaters inserted in said cable at intervals along its length, for amplifying signal impulses sent over said cable, and means to energize said repeaters by direct current sent over said cable, the path for said direct current over the cable being continuous from end to end of the system and insulated from ground at all points between the ends of the cable.

31. A submarine cable system comprising an armored cable adapted to be laid on the sea bottom, terminal stations including means for sending message waves over the cable, means for sending direct current over said cable simultaneously with and independently of said message waves, a repeater for said cable inclosed in a housing adapted to be laid on the sea bottom, said repeater comprising a space discharge type amplifier having cathode-heating and anode circuits, and leads electrically connecting said repeater to the circuit of said cable to amplify the message currents sent over said cable, said direct current serving to energize the cathode-heating and anode circuits of said repeater, said repeater housing being mechanically secured to the armor of said cable.

OLIVER E. BUCKLEY.
OLIVER B. JACOBS.